(12) United States Patent
Wagner et al.

(10) Patent No.: US 9,212,612 B2
(45) Date of Patent: Dec. 15, 2015

(54) METHOD AND DEVICE FOR PERFORMING A CONTROL, IN PARTICULAR FOR USE IN A MOTOR VEHICLE

(75) Inventors: Alexandre Wagner, Stuttgart (DE); Thomas Bleile, Stuttgart (DE); Sascha Eichinger, Benningen am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 592 days.

(21) Appl. No.: 13/598,965

(22) Filed: Aug. 30, 2012

(65) Prior Publication Data

US 2013/0060450 A1 Mar. 7, 2013

(30) Foreign Application Priority Data

Sep. 1, 2011 (DE) .......................... 10 2011 081 949

(51) Int. Cl.
| | |
|---|---|
| *F02B 33/00* | (2006.01) |
| *F02D 41/00* | (2006.01) |
| *F02D 41/14* | (2006.01) |
| *F02B 37/16* | (2006.01) |

(52) U.S. Cl.
CPC ........ *F02D 41/0007* (2013.01); *F02D 41/1401* (2013.01); *F02D 41/145* (2013.01); *F02B 37/16* (2013.01); *F02D 2041/1433* (2013.01); *Y02T 10/144* (2013.01)

(58) Field of Classification Search
CPC ............................ F02B 33/446; F02B 37/18
USPC ........................ 123/564; 60/600, 605.2, 611
See application file for complete search history.

(56) References Cited

U.S. PATENT DOCUMENTS

| | | | |
|---|---|---|---|
| 2004/0250801 A1* | 12/2004 | Baeuerle .................... 123/565 |
| 2005/0000216 A1* | 1/2005 | Bleile et al. .................... 60/611 |
| 2005/0188696 A1* | 9/2005 | Herz et al. .................... 60/612 |
| 2007/0144174 A1* | 6/2007 | Baeuerle et al. ............ 60/605.1 |
| 2008/0059043 A1* | 3/2008 | Ehlers et al. ................. 701/102 |
| 2008/0104957 A1* | 5/2008 | Birkner et al. ................. 60/602 |
| 2009/0019848 A1* | 1/2009 | Ballauf et al. ................. 60/602 |
| 2012/0173118 A1* | 7/2012 | Wang et al. ................... 701/102 |

* cited by examiner

*Primary Examiner* — John Kwon
(74) *Attorney, Agent, or Firm* — Kenyon & Kenyon LLP

(57) ABSTRACT

A method for operating a boost pressure control in an engine system having a supercharged internal combustion engine, including the following: performing a boost pressure control based on a setpoint controller variable and an actual controller variable, ascertaining a setpoint controller variable from a provided setpoint boost pressure with a first and a second model, ascertaining an intermediate variable from a provided actual boost pressure with the first model, correcting the intermediate variable with a provided dynamic variable, which represents a dynamic change in the state of the engine system using a higher dynamics than the actual boost pressure, and ascertaining the actual controller variable from the corrected intermediate variable with the second model.

10 Claims, 2 Drawing Sheets

METHOD AND DEVICE FOR PERFORMING A CONTROL, IN PARTICULAR FOR USE IN A MOTOR VEHICLE

RELATED APPLICATION INFORMATION

The present application claims priority to and the benefit of German patent application no. 10 2011 081 949.5, which was filed in Germany on Sep. 1, 2011, the disclosure of which is incorporated herein by reference.

FIELD OF THE INVENTION

The present invention relates to internal combustion engines, in particular supercharged diesel engines having a boost pressure control.

BACKGROUND INFORMATION

Modern internal combustion engines normally use a supercharger for providing fresh air at an increased pressure to the internal combustion engine. Commonly used superchargers include exhaust gas turbochargers, for example. Superchargers are used for providing fresh air at a boost pressure as a function of the operating point of the internal combustion engine. In the case of exhaust gas turbochargers, the energy for compressing the fresh air is obtained from the exhaust gas enthalpy and it is therefore advantageous to set the boost pressure at a value that is not higher than needed for the instantaneous operating point, since otherwise the exhaust gas counterpressure generated by the turbine of the exhaust gas turbocharger reduces the efficiency of the internal combustion engine.

SUMMARY OF THE INVENTION

According to the exemplary embodiments and/or exemplary methods of the present invention, a method is described for operating a boost pressure control in an engine system and a device, an engine system, and a computer program product. Other advantageous embodiments of the present invention are provided in the further descriptions herein.

According to a first aspect, a method is provided for operating a boost pressure control in an engine system having a supercharged internal combustion engine. The method includes the following steps:
performing a boost pressure control based on a setpoint controller variable and an actual controller variable,
ascertaining the setpoint controller variable from a provided setpoint boost pressure with the aid of a first and a second model,
ascertaining an intermediate variable from a provided actual boost pressure with the aid of the first model,
correcting the intermediate variable with the aid of a provided dynamic variable, which represents a dynamic change in the state of the engine system using a higher dynamics than the actual boost pressure, and
ascertaining the actual controller variable from the corrected intermediate variable with the aid of the second model.

One idea of the above-mentioned method is to improve the quality of the boost pressure control and, in particular, to achieve a more rapid response of the boost pressure control during the dynamic operation. This is achieved by taking into account a dynamic variable during the boost pressure control, the dynamic variable representing a dynamic change in the state of the engine system using a higher dynamics or following it faster than the actual boost pressure, as is the case, for example, with the exhaust gas counterpressure. The dynamic variable is therefore suitable for recognizing changes faster than the boost pressure due to a dynamic operation of the internal combustion engine or due to an intervention of an interfering variable.

The above method provides for taking into account information about the dynamics of the dynamic variable with the aid of a suitable boost pressure control strategy. The purpose of the coupling is the use of a more advantageous phase angle and of the higher dynamics, as well as the improvement of the control loop dynamics compared to a pure boost pressure control.

It may be furthermore provided that a steady-state or low-frequency component of the provided dynamic variable or of a variable from which the dynamic variable is generated is used for steady-state model adaptation. This allows the quality of the model of the dynamic variable, used as a basis, to be improved and model errors or system tolerances to be compensated for.

Furthermore, the intermediate variable may be corrected by adding a high-frequency component of the dynamic variable to the intermediate variable.

According to another specific embodiment, the intermediate variable may indicate an estimated exhaust gas counterpressure in an exhaust gas discharge section of the engine system, and the dynamic variable may indicate a measured or modeled exhaust gas counterpressure.

It may be provided that the first model corresponds to an exhaust gas counterpressure model for exhaust gas counterpressure information to be ascertained from provided boost pressure information. An estimated actual exhaust gas counterpressure is thus ascertained using a suitable exhaust gas counterpressure model during the boost pressure control, and is acted on by a dynamic change in the exhaust gas counterpressure, which may be either modeled or measured, from which the actual controller variable is ascertained.

The boost pressure control is now based on this actual controller variable, which has been ascertained from the actual boost pressure and a dynamic component of the exhaust gas counterpressure. This may speed up the controller response, since the exhaust gas counterpressure usually allows changes during the dynamic operation of the internal combustion engine or the effect of interfering variables to be recognized faster than the boost pressure does. In this way an improved turbocharger protection or engine protection may be ensured and the achievability of future exhaust gas guidelines may be supported.

Furthermore, the second model may correspond to a controller variable model for ascertaining a controller variable from a piece of exhaust gas counterpressure information.

A low-frequency component of the dynamic variable may be used for adaptation of the first model.

According to another aspect, a device is provided for operating a boost pressure control in an engine system having a supercharged internal combustion engine, the device being configured:
for performing a boost pressure control based on a setpoint controller variable and an actual controller variable,
for ascertaining a setpoint controller variable from a provided setpoint boost pressure with the aid of a first and a second model,
for ascertaining an intermediate variable from a provided actual boost pressure with the aid of the first model,
for correcting the intermediate variable with the aid of a provided dynamic variable, which represents a dynamic change in the state of the engine system using a higher dynamics than the actual boost pressure, and for ascertaining the actual controller variable from the corrected intermediate variable with the aid of the second model.

An engine system is provided according to another aspect. The engine system includes:

an internal combustion engine, to which fresh air is supplied via an air supply section and from which combustion exhaust gas is discharged via an exhaust gas discharge section, a supercharger for providing fresh air at a boost pressure, and the above-mentioned device.

According to another aspect, a computer program product having program code is provided which carries out the above-mentioned method when it is executed on a data processing device.

In the following, specific embodiments of the present invention are described in greater detail with reference to the appended drawings.

DETAILED DESCRIPTION

Figure 1:
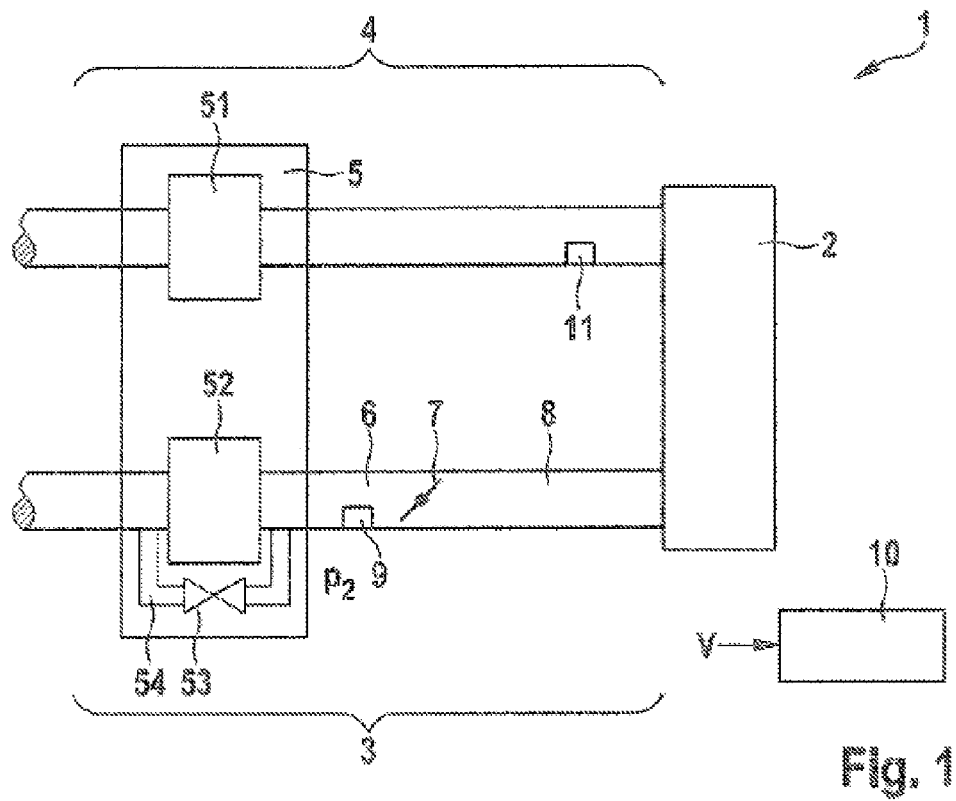
FIG. 1 shows a schematic illustration of an engine system having a supercharger.

FIG. 1 shows a schematic illustration of an engine system 1 having an internal combustion engine 2, which may be configured as a diesel engine, a gasoline engine, or the like. For the description that follows, a diesel engine is assumed as internal combustion engine 2.

Fresh air from the surroundings is supplied to the cylinders of internal combustion engine 2 via an air supply section 3. Fuel is combusted in the cylinders. The combustion exhaust gases being created are discharged from internal combustion engine 2 via an exhaust gas discharge section 4.

Furthermore, an exhaust gas turbocharger 5 is provided, which has a turbine 51, which is situated in exhaust gas discharge section 4, so that the combustion exhaust gas flowing from internal combustion engine 2 is converted to driving energy in the turbine.

Turbine 51 is coupled to a compressor 52, which is situated in air supply section 3. Driven by turbine 51, compressor 52 takes in fresh air from the surroundings and makes it available in a boost pressure area 6 of air supply section 3 at a boost pressure $p_2$.

A throttle valve 7, which separates boost pressure area 6 from an intake manifold area 8 of air supply section 3, is also provided in air supply section 3. The quantity of air supplied to the cylinders of internal combustion engine 2 may thus be rapidly influenced via throttle valve 7.

A control unit 10 is provided, which controls internal combustion engine 2 on the basis of an external default variable V such as a driver intended torque in a motor vehicle, which may be indicated via a position of an accelerator pedal, or as a function of state variables of engine system 1. Internal combustion engine 2 may be operated, for example, by varying the fuel quantity injected into the cylinders or into intake manifold area 8, the position of throttle valve 7, the setting of the pumping capacity of exhaust gas turbocharger 5, the setting of boost pressure $p_2$ and the like.

For setting boost pressure $p_2$, exhaust gas turbocharger 5 may provide a turbine 51 having a variable turbine geometry or a wastegate having a wastegate valve situated therein. In the exemplary embodiment shown in FIG. 1, boost pressure $p_2$ may be set or influenced, for example, with the aid of a bypass valve 53 in a bypass line 54, which connects an inlet side to an outlet side of compressor 52.

For controlling boost pressure $p_2$ in boost pressure area 6 of air supply section 3, control unit 10 controls bypass valve 53 as appropriate for reducing boost pressure $p_2$ by recirculating the compressed fresh air in boost pressure area 6 to the inlet side of compressor 52. By opening (increasing the flow-through of) bypass valve 53 or by closing (reducing the flow-through of) bypass valve 53, boost pressure $p_2$ may be reduced or increased.

Control unit 10 receives information about boost pressure $p_2$ (boost pressure information), which is made available by a boost pressure sensor 9 either as a sensor variable or, alternatively, as a model variable, boost pressure $p_2$ being modeled via other state variables of engine system 1. Furthermore, an exhaust gas counterpressure sensor 11 may be provided for detecting information via an exhaust gas counterpressure $p_{3,actual}$ (exhaust gas counterpressure information) and making it available as an input variable of the boost pressure control.

Figure 2:
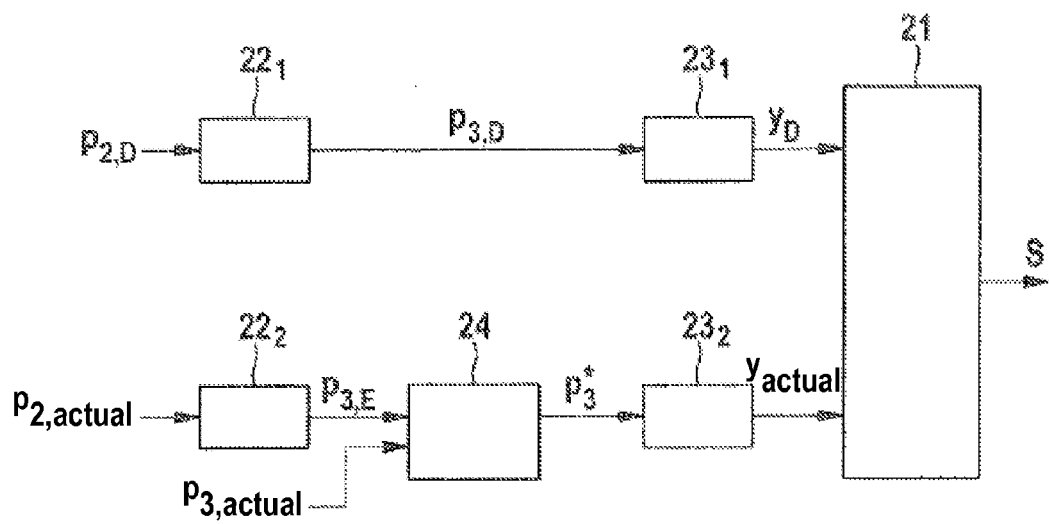
FIG. 2 shows a functional block diagram of a boost pressure control for operating the engine system of FIG. 1.

FIG. 2 illustrates a schematic functional diagram of the boost pressure control implemented in control unit 10. According to a boost pressure model used as a basis, the boost pressure control illustrated in FIG. 2 provides the generation of a controller variable y, on which the boost pressure control is based, from a piece of the boost pressure information. The boost pressure model is thus used for generating a setpoint controller variable $y_D$ from a setpoint boost pressure $p_{2,D}$ and an actual controller variable $y_{actual}$ from an actual boost pressure $p_{2,actual}$.

Controller variable y may correspond, for example, to a position of bypass valve 53 or to a position of another actuator for setting the pumping capacity of compressor 52. The output variable of controller 21 is a manipulated variable S, which provides activation for bypass valve 53 or corresponds to another type of activation of the supercharger for setting its efficiency. For example, the manipulated variable may correspond to a duty factor for the activation of bypass valve 53.

In the present specific embodiment, the underlying boost pressure model is based on two submodels: an exhaust gas counterpressure model, which is used twice in a first and a second exhaust gas counterpressure model block $22_1$, $22_2$ for ascertaining an exhaust gas counterpressure $p_3$, which is based on information about a boost pressure $p_2$, and a manipulated variable model, which is used twice in a first and a second controller variable block $23_1$, $23_2$.

First exhaust gas counterpressure model block $22_1$ is used for generating a setpoint exhaust gas counterpressure $p_{3,D}$ (setpoint exhaust gas counterpressure information) from a provided setpoint boost pressure $p_{2,D}$, which results from an engine model as a function of a predefined driver intended torque, among other things. Second exhaust gas counterpressure model block $22_2$ is used for generating an estimated exhaust gas counterpressure $p_{3,E}$ from an actual boost pressure $p_{2,actual}$, provided by boost pressure sensor 9, for example.

Furthermore, first controller variable block $23_1$ is used for generating a setpoint controller variable $y_D$ from setpoint exhaust gas counterpressure $p_{3,D}$. Second controller variable block $23_2$ is used for generating an actual controller variable $y_{actual}$ from a corrected exhaust gas counterpressure $p_3^*$.

Corrected exhaust gas counterpressure $p_3^*$ is ascertained in a coupling block 24 from estimated exhaust gas counterpressure $p_{3,E}$ and a measured (or modeled) exhaust gas counterpressure $p_{3,actual}$. Coupling block 24 is used for linking a dynamic component of exhaust gas counterpressure $p_{3,actual}$ to exhaust gas counterpressure $p_{3,E}$ estimated in second exhaust gas counterpressure model block $22_2$. Since estimated exhaust gas counterpressure $p_{3,E}$ is ascertained from provided actual boost pressure $p_{2,actual}$, rapid dynamic changes in the operating state of internal combustion engine 2 may be shown only with a delay, namely, only when a change in the operating state is manifested in a change in boost pressure $p_2$. Applying a dynamic component of measured exhaust gas counterpressure $p_{3,actual}$ to estimated boost pressure $p_{3,E}$ helps obtain a corrected exhaust gas counterpressure $p_3^*$, which has a better phase angle than exhaust gas counterpressure $p_{3,E}$, which has been estimated only from boost pressure $p_2$.

Figure 3:
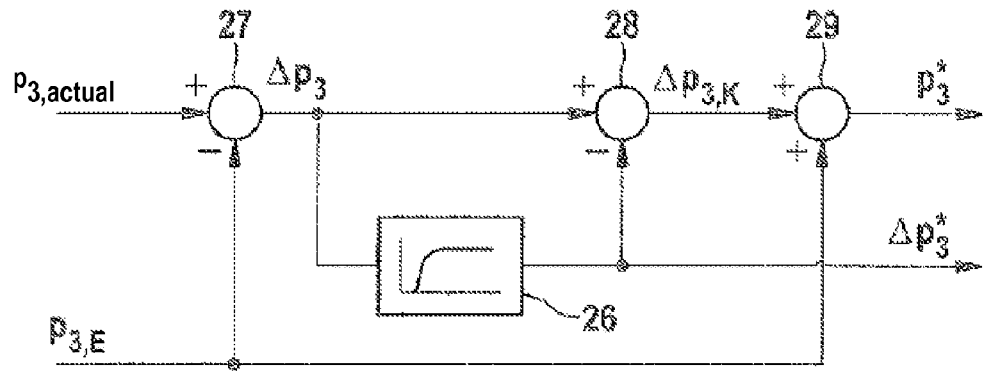
FIG. 3 shows a functional illustration of an option for coupling the exhaust gas counterpressure into the boost pressure control.

FIG. 3 illustrates the function of coupling block 24 in greater detail. The core of coupling block 24 is a low-pass filter 26, which low-pass filters an exhaust gas counterpressure difference $\Delta_3$, which has been ascertained in a subtraction element 27 as the difference between actual exhaust gas counterpressure $p_{3,actual}$ and estimated exhaust gas counterpressure $p_{3,E}$ and provides low-pass filtered exhaust gas counterpressure difference $\Delta_3^*$. In a second subtraction block 28, low-pass filtered exhaust gas counterpressure difference $\Delta p_3^*$ is subtracted from exhaust gas counterpressure difference $\Delta p_3$ so that a corrected exhaust gas counterpressure difference $\Delta p_{3,K}$ is obtained.

In an adding block 29, estimated exhaust gas counterpressure $p_{3,E}$ from second exhaust gas counterpressure model block $22_2$ is added to corrected exhaust gas counterpressure difference $\Delta p_{3,K}$ to obtain corrected exhaust gas counterpressure $p_3^*$. Corrected exhaust gas counterpressure $p_3^*$ thus corresponds to an estimated exhaust gas counterpressure, which has been ascertained from the boost pressure according to the boost pressure model and which has been acted on by a high-frequency component of actual exhaust gas counterpressure $p_{3,actual}$. Of course, it is also possible to ascertain corrected exhaust gas counterpressure $p_3^*$ in some other way, as long as this variable properly takes into account the dynamic, i.e., high-frequency, component of the exhaust gas counterpressure. For example, the high-frequency component may also be provided with the aid of a high-pass filter.

With the aid of these variables, it is now possible to address rapid changes in the operating state of internal combustion engine 2 during the boost pressure control, even before the actual boost pressure substantially differs from setpoint boost pressure $p_{2,D}$. This is possible, since the exhaust gas counterpressure responds faster to changes in the operating states of internal combustion engine 2, in particular to dynamic influences. The control thus may use a more favorable phase angle and thus take into account the high dynamics of the exhaust gas counterpressure.

Figure 4:
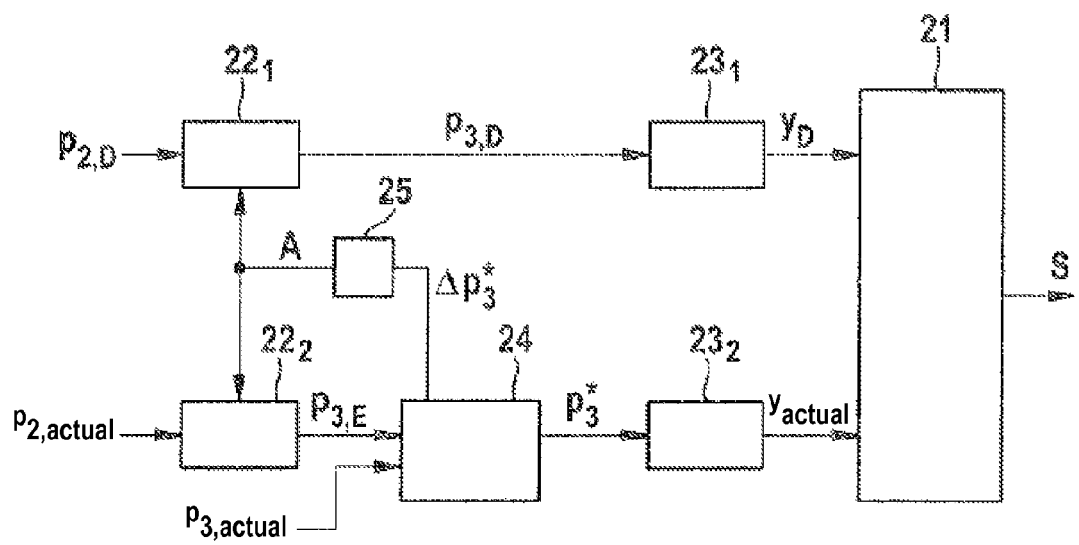
FIG. 4 shows a functional block diagram of a boost pressure control for operating the engine system of FIG. 1 according to another specific embodiment.

Filtered exhaust gas counterpressure difference $\Delta p_3^*$ represents a low-frequency component of the actual exhaust gas counterpressure signal. As the functional diagram of FIG. 4 shows, it may be used in an additional model adaptation block 25 for generating an adaptation variable A, using which the exhaust gas counterpressure model may be appropriately adapted in exhaust gas counterpressure model blocks $22_1$, $22_2$. Permanent changes in the system behavior due to aging, wear, and the like may thus be taken into account in the exhaust gas counterpressure model. The quality of the exhaust gas counterpressure model is thus improved and model errors or system tolerances are compensated for.

What is claimed is:

1. A method by a control unit of an engine system, the engine system including a supercharged internal combustion engine, the method comprising:
    obtaining, by the control unit, a value of an actual boost pressure in the engine system based on first output of a sensor arrangement;
    obtaining, by the control unit and based on second output of the sensor arrangement, a value of a dynamic variable that more quickly responds to a dynamic change in a state of the engine system than does the actual boost pressure;
    applying, by the control unit, the obtained actual boost pressure value as input to a first function, which produces a first intermediate variable value based on the input actual boost pressure value;
    correcting, by the control unit, the intermediate variable value based on the obtained value of the dynamic variable;
    applying, by the control unit, the corrected intermediate variable value as input to a second function, which produces a first controller variable value based on the input corrected intermediate variable value;
    obtaining, by the control unit, a setpoint boost pressure value;
    applying, by the control unit, the obtained setpoint boost pressure value as input to the first function, which produces a second intermediate variable value based on the input setpoint boost pressure value;
    applying, by the control unit, the second intermediate variable value as input to the second function, which produces a second controller variable value based on the input second intermediate variable value; and
    controlling, by the control unit, the boost pressure in the engine system based on the first and second controller variables.

2. The method of claim 1, wherein the intermediate variable value is corrected by adding a high-frequency component of the dynamic variable value to the intermediate variable value.

3. The method of claim 1, wherein the intermediate variable value indicates an estimated exhaust gas counterpressure in an exhaust gas discharge section of the engine system, and wherein the dynamic variable value indicates a measured exhaust gas counterpressure.

4. The method of claim 1, wherein the first function operates so that its output is a value of an exhaust gas counterpressure estimated to be in the engine system when a value of the boost pressure in the engine system is used as input to the first function.

5. The method of claim 1, wherein the intermediate variable value represents an estimate of an exhaust gas counterpressure in the engine system.

6. The method of claim 1, further comprising using a low-frequency component of the dynamic variable value to modify the first function.

7. A device comprising:
    a control unit configured to be coupled to an engine system that includes a supercharged internal combustion engine, the control unit being configured for, when coupled to the engine system, performing the following:

obtaining a value of an actual boost pressure in the engine system based on first output of a sensor arrangement;

obtaining, based on second output of the sensor arrangement, a value of a dynamic variable that more quickly responds to a dynamic change in a state of the engine system than does the actual boost pressure;

applying the obtained actual boost pressure value as input to a first function, which produces a first intermediate variable value based on the input actual boost pressure value;

correcting the intermediate variable value based on the obtained value of the dynamic variable;

applying the corrected intermediate variable value as input to a second function, which produces a first controller variable value based on the input corrected intermediate variable value;

obtaining a setpoint boost pressure value;

applying the obtained setpoint boost pressure value as input to the first function, which produces a second intermediate variable value based on the input setpoint boost pressure value;

applying the second intermediate variable value as input to the second function, which produces a second controller variable value based on the input second intermediate variable value; and controlling the boost pressure in the engine system based on the first and second controller variables.

8. An engine system, comprising:

an internal combustion engine, to which fresh air is supplied via an air supply section and from which combustion exhaust gas is discharged via an exhaust gas discharge section;

a supercharger for providing fresh air; and a device including a control unit coupled to the engine system and configured for performing the following:

obtaining a value of an actual boost pressure in the engine system at which boost pressure the supercharger provides the fresh air, the value of the actual boost pressure being based on first output of a sensor arrangement;

obtaining, based on second output of the sensor arrangement, a value of a dynamic variable that more quickly responds to a dynamic change in a state of the engine system than does the actual boost pressure;

applying the obtained actual boost pressure value as input to a first function, which produces a first intermediate variable value based on the input from a provided actual boost pressure value;

correcting the intermediate variable value based on the obtained value of the dynamic variable;

applying the corrected intermediate variable value as input to a second function, which produces a first controller variable value based on the input corrected intermediate variable value;

obtaining a setpoint boost pressure value;

applying the obtained setpoint boost pressure value as input to the first function, which produces a second intermediate variable value based on the input setpoint boost pressure value;

applying the second intermediate variable value as input to the second function, which produces a second controller variable value based on the input second intermediate variable value; and controlling the boost pressure in the engine system based on the first and second controller variables.

9. A non-transitory computer readable medium on which is stored a computer program, which is executable by a processor and which, when executed by the processor, causes the processor to perform a method for operating an engine system, the engine system including a supercharged internal combustion engine, the method comprising:

obtaining a value of an actual boost pressure in the engine system based on first output of a sensor arrangement;

obtaining, based on second output of the sensor arrangement, a value of a dynamic variable that more quickly responds to a dynamic change in a state of the engine system than does the actual boost pressure;

applying the obtained actual boost pressure value as input to a first function, which produces a first intermediate variable value based on the input actual boost pressure value;

correcting the intermediate variable value based on the obtained value of the dynamic variable; and applying the corrected intermediate variable value as input to a second function, which produces a first controller variable value based on the input corrected intermediate variable value;

obtaining a setpoint boost pressure value;

applying the obtained setpoint boost pressure value as input to the first function, which produces a second intermediate variable value based on the input setpoint boost pressure value;

applying the second intermediate variable value as input to the second function, which produces a second controller variable value based on the input second intermediate variable value; and controlling the boost pressure in the engine system based on the first and second controller variables.

10. The method of claim 1, wherein the intermediate variable value indicates an estimated exhaust gas counterpressure in an exhaust gas discharge section of the engine system, and wherein the dynamic variable value indicates an actual exhaust gas counterpressure determined from a state of the engine system.

* * * * *